United States Patent
Ianev et al.

(10) Patent No.: US 9,860,924 B2
(45) Date of Patent: Jan. 2, 2018

(54) WIRELESS COMMUNICATION TERMINAL AND METHOD FOR WIRELESS COMMUNICATION

(71) Applicant: NEC Corporation, Tokyo (JP)

(72) Inventors: Iskren Ianev, Berkshire (GB); Yannick Lair, Berkshire (GB); Thomas Delsol, Berkshire (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/761,760

(22) PCT Filed: Jan. 10, 2014

(86) PCT No.: PCT/JP2014/050868
§ 371 (c)(1),
(2) Date: Jul. 17, 2015

(87) PCT Pub. No.: WO2014/156230
PCT Pub. Date: Oct. 2, 2014

(65) Prior Publication Data
US 2016/0007388 A1 Jan. 7, 2016

(30) Foreign Application Priority Data
Mar. 28, 2013 (GB) .................................. 1305796.3

(51) Int. Cl.
*H04W 72/00* (2009.01)
*H04W 76/02* (2009.01)
(Continued)

(52) U.S. Cl.
CPC ........... *H04W 76/02* (2013.01); *H04W 4/005* (2013.01); *H04W 4/20* (2013.01); *H04W 72/0493* (2013.01)

(58) Field of Classification Search
CPC ..................................................... H04W 76/02
See application file for complete search history.

(56) References Cited

U.S. PATENT DOCUMENTS

| | | | | |
|---|---|---|---|---|
| 2005/0144294 | A1* | 6/2005 | Gellens ................. | H04W 76/02 709/228 |
| 2012/0254890 | A1* | 10/2012 | Li .......................... | H04W 4/005 719/313 |
| 2013/0083726 | A1* | 4/2013 | Jain ....................... | H04W 4/005 370/328 |

FOREIGN PATENT DOCUMENTS

| EP | 2 533 463 | 12/2012 |
|---|---|---|
| WO | WO 2011/119680 | 9/2011 |
| WO | WO 2012/041122 | 4/2012 |

OTHER PUBLICATIONS

International Search Report, PCT/JP2014/050868, dated Feb. 10, 2014.

(Continued)

Primary Examiner — Idowu O Osifade
(74) Attorney, Agent, or Firm — Young & Thompson

(57) ABSTRACT

The invention provides for a wireless communications terminal (502), and related system and method, for wirelessly communicating with a network (504, 506). The terminal (502) is arranged to transmit, as part of a wireless connection establishment procedure for forming a wireless connection between the terminal (502) and the network (504, 506), wireless-connection establishment signalling (510) including a small-data indicator to indicate to the network (504) that transmission of an amount of data below a threshold value is required from the terminal (502) by way of the wireless connection to the network (504, 506).

4 Claims, 10 Drawing Sheets

| NAS Procedure | | RRC Establishment Cause |
|---|---|---|
| Attach | | Mobile Originated Signalling<br>Delay Tolerant Access<br>Emergency |
| Detach | | Mobile Originating Signalling |
| Tracking Area Update | | Mobile Originated Signalling<br>Delay Tolerant Access<br>Emergency |
| Service Request | User plane radio resources request | Mobile Originating Data<br>Delay Tolerant Access<br>Emergency |
| | Uplink signalling resources request | Mobile Originating Data<br>Delay Tolerant Access |
| | Paging response for PS core network domain | Mobile Terminating Access |
| | PDN connectivity request for emergency | Emergency |
| Extended Service Request | Mobile originating CS fallback | Mobile Originating Data<br>Delay Tolerant Access |
| | Mobile terminating CS fallback | Mobile Terminating Access |
| | Mobile originating CS fallback emergency call | Emergency |

(51) Int. Cl.
*H04W 4/00* (2009.01)
*H04W 4/20* (2009.01)
*H04W 72/04* (2009.01)

(56) References Cited

OTHER PUBLICATIONS

Renesas Mobile Europe Ltd., RAN Efficiency Improvement Schemes, 3GPP TSG-RAN WG2 Meeting #75bis R2-115317, Oct. 3, 2011.
Ericsson, ST-Ericsson, Small data fast path, SA WG2 Meeting #94 S2-124707, Nov. 16, 2012.
Intel Corporation, Summary and impact analysis of SA2 proposed SDDTE solutions for MTCe, 3GPP TSG RAN WG2 Meeting #81bis R2-131413, Apr. 6, 2013.
Search and Examination Report, GB1305796.3, dated Sep. 6, 2013.

* cited by examiner

Fig. 2

| RRC Establishment Cause (CHOICE Type) ||
|---|---|
| Cause: | Emergency |
| | High Priority Access |
| | Mobile Terminating Access |
| | Mobile Originating Signalling |
| | Mobile Originating Data |
| | Delay Tolerant Access (3GPP Rel-10) |
| | Spare 2 |
| | Spare 1 |

Fig. 3

| NAS Procedure | | RRC Establishment Cause |
|---|---|---|
| Attach | | Mobile Originated Signalling<br>Delay Tolerant Access<br>Emergency |
| Detach | | Mobile Originating Signalling |
| Tracking Area Update | | Mobile Originated Signalling<br>Delay Tolerant Access<br>Emergency |
| Service Request | User plane radio resources request | Mobile Originating Data<br>Delay Tolerant Access<br>Emergency |
| | Uplink signalling resources request | Mobile Originating Data<br>Delay Tolerant Access |
| | Paging response for PS core network domain | Mobile Terminating Access |
| | PDN connectivity request for emergency | Emergency |
| Extended Service Request | Mobile originating CS fallback | Mobile Originating Data<br>Delay Tolerant Access |
| | Mobile terminating CS fallback | Mobile Terminating Access |
| | Mobile originating CS fallback emergency call | Emergency |

Fig. 4

| RRC Establishment Cause(CHOICE Type) ||
|---|---|
| Cause: | Emergency |
| | High Priority Access |
| | Mobile Terminating Access |
| | Mobile Originating Signalling |
| | Mobile Originating Data |
| | Delay Tolerant Access(3GPP Rel-10) |
| | Small Data |
| | Spare 1 |

Fig. 6

| RRC Establishment Cause (CHOICE Type) ||
|---|---|
| Cause: | Emergency |
| | High Priority Access |
| | Mobile Terminating Access |
| | Mobile Originating Signalling |
| | Mobile Originating Data |
| | Delay Tolerant Access (3GPP Rel-10) |
| | High Priority Small Data |
| | Low Priority Small Data |

Fig. 8

| Extended RRC Establishment Cause (CHOICE Type) ||
|---|---|
| Cause: | Small Data |
| | Spare 1 |
| | Spare 2 |
| | Spare 3 |
| | Spare 4 |
| | Spare 5 |
| | Spare 6 |

WIRELESS COMMUNICATION TERMINAL AND METHOD FOR WIRELESS COMMUNICATION

TECHNICAL FIELD

The present invention relates to Small Data transmission within a wireless network environment.

BACKGROUND ART

It is established for a wireless terminal and wireless network, as part of their interoperation with each other, to perform a Radio Resource Control (RRC) Connection Establishment procedure. This is required in order to make the transition from RRC Idle mode to RRC Connected mode prior to any application data being transmitted between the terminal and the network and prior to completion of any signalling procedures.

The RRC connection establishment procedure is initiated by the terminal, which is generally referred to as a user equipment (UE) in the context of 3rd and 4th generation cellular wireless communication systems complying with European 3rd Generation Partnership Project (3GPP) standards, including Long Term Evolution (LTE).

In case of LTE, a non-access stratum (NAS) signalling message is transmitted as part of the RRC connection establishment procedure (in RRC Connection Setup Complete message), whereas in case of Universal Mobile Telecommunications System (UMTS) Terrestrial Radio Access Network (UTRAN), the initial NAS message is transmitted after the RRC connection establishment procedure.

3GPP specification TS36.331, s.6.2.2 specifies that an 'Establishment Cause' is included in a RRC Connection Request message, the message forming a first step in the RRC connection establishment procedure.

FIG. 1 is a signalling flow diagram illustrating the signalling steps of the RRC connection establishment procedure specified in the aforesaid 3GPP specification TS36.331, s.5.3.3. Here there is illustrated a wireless terminal (UE) 102 and a network 104 represented as source and destination entities between which signals can be transmitted, the source and destination of each signal being indicated by respective vertical lines attached to, and associated with, the respective wireless terminal (UE) 102 and network 104. Signals, shown as horizontal arrows 110, 112, 114, are transmitted between the wireless terminal 102 and the network 104. In a first step, the wireless terminal (UE) 102 transmits a RRC Connection Request message 110 to the network 104. In a second step, the network 104 transmits a RRC Connection Setup message 112 to the wireless terminal (UE) 102. In a third step, and subsequent to receipt of the signal 112, the wireless terminal (UE) 102 transmits a RRC Connection Setup Complete message 114 to the network 104.

FIG. 2 is a table including a list of possible RRC Establishment Causes, noting in particular that there are two spare values for RRC cause (Spare 1, Spare 2).

FIG. 3 is a table showing, in simplified form, a relationship between the RRC cause and the (Network Access Stratum) NAS procedure as specified in TS24.301, Annex D.1. The RRC Establishment cause is determined by the NAS procedure for which the connection is being established. For example, for the NAS procedure "Attach", there are three possible RRC Establishment Causes: Mobile Originated Signalling; Delay Tolerant Access; and Emergency.

Many Machine-Type Communication (MTC) applications executed on wireless terminals send or receive amounts of data that are much smaller than amounts of data that are sent and/or received by other types of applications, for example a voice communication. Also there is a huge increase in 'smart phone' use where many applications exchange so-called 'keep-alive' messages with the network, such messages periodically notifying an application, running on an equipment or server remote to the terminal and connected to the network, that the terminal is still connected to the network and wants to maintain an intermittent connection with the remote equipment or server. All this can lead to inefficient use of resources in the 3GPP system.

The 3GPP SA1 Working Group has already identified the above-mentioned transmission/reception of small amounts of data, identified as 'small data transmission', as one of the features of MTC. 3GPP specification TS22.368, s7.2.5, defines the MTC feature 'Small Data Transmission' which is intended, as suggested above, for use with MTC Devices that send or receive small amounts of data. Observed sizes of many instances of data exchange are of the order of 1 k octets (1,024 octets) but this should in no way be considered as defining or limiting the reference to small data within the context of the present invention. 3GPP is currently standardising the Machine Type Communication (MTC) and a specific feature of MTC is that there will be many instances of a very small data exchange (in one or both directions), and in the order of 1 IP packet for example. For this reason the 3GPP (SA1) has defined in TS22.368 a specific MTC feature called 'Small Data Transmission'. Adoption of the present invention within, for example, 3GPP will allow for efficient small data transmission. Reference to small data therefore carries with it the implication such data may be treated differently from normal data. Thus, the above mentioned example in TS22.368 of 1 k octet is just one example and it should be understood that the understanding or definition of small data may be configurable (per subscription for example) by the network operators.

The 3GPP SA2 Working Group is currently investigating Small Data transmission optimisation (including keep-alive messages from smart phones) as part of the MTCe-SDDTE (Small Data and Device Triggering Enhancements) Work Item—see TR23.887, s5.1. A key issue of the investigation is 'Efficient Small Data transmission'. The following functional requirement for Small Data transmission was agreed in TR23.887, s.5.1.1.2:

"The system shall support transmissions of small amounts of data efficiently with minimal network impact (e.g. signalling overhead, network resources, delay for reallocation)."

SA2 has already agreed several possible solutions for efficient small data transmission in 3GPP technical report TR23.887. One of the possible solutions (Small Data Transfer starting from RRC IDLE, s5.1.1.3.1) includes transferring the small data as NAS signalling within RRC Connection Complete message (mentioned above) with use of pre-established NAS security and without establishing RRC security.

For this, in section 5.1.1.3.1 of the report, the following feature is suggested to be used:

"For Small Data transmission UE's application requests NAS to request the UE's AS to establish an RRC connection "for a Tracking Area Update" and the RRC Connection is established with RRC establishment cause='mo signalling' rather than cause='mo data'."

The use of a "mo-signalling" (mobile originated signalling) RRC cause allows the evolved Node B (eNB) to detect that a short-lived signalling procedure is in progress. The mo-signalling cause is employed to indicate that only signalling, and thus no data, is to be transmitted. The use of a "mo-data" cause serves to indicate to the network that data is also to be transmitted and if there is data for transmission as well, the network serves to configure the UE for measurement reporting. Small data would typically use a "mo-data" establishment cause and the network then configure the UE for measurements. Hence, it is unlikely that the Mobility Management Entity (MME) will download the security context to the eNB. Without the security context, handover cannot be performed. Thus, the eNB would not configure the UE to perform measurement reporting and radio resources would be saved. The above feature or adaptation allows the small data transmission to take place by modifying the behaviour of the eNB when a request for small data transmission is detected.

However another problem exists, as stated in the TR23.887:

"Editor's Note: Interactions of Low Access Priority with "mo-Signalling" are FFS (i.e., how can both be set as the Establishment Cause in the RRC Connection Request)."

That is, for small data transmissions, it is here proposed that a "mo-signalling" establishment cause is used, rather than "mo-data" so that the network does not configure the UE for measurements and so thereby save network resources.

SUMMARY OF INVENTION

Technical Problem

Because of the above-proposed use of "mo-signalling" establishment cause for small data transmission, the eNB does not know that the requested RRC connection is for Small Data transfer because the RRC cause is 'mo-signalling'. Also Small Data transmission, as suggested in the above solution from TR23.887, cannot be treated as low priority because mo-signalling RRC cause is used instead of 'Delay Tolerant Access' RRC cause (the two cannot be used at the same time). This is a significant problem as small data transmission originating from a MTC terminal (which would include most 'keep-alive' data) are in fact generally of low priority;

Also, there would be a problem if any other Small Data-specific functionality must be triggered by the eNB.

Such known arrangements are therefore limited in their effectiveness in improving efficiency of small data transmissions.

The present invention seeks to provide for wireless communications methods, systems and terminal devices for small data transmission and having advantages over known such methods, systems and devices.

Solution to Problem

According to one aspect of the present invention there is provided a wireless communications terminal arranged to wirelessly communicate with a network, the terminal being arranged to transmit, as part of a wireless connection establishment procedure for forming a wireless connection between the terminal and the network, wireless-connection establishment signalling including a small-data indicator to indicate to the network that transmission of an amount of data below a threshold value is required from the terminal by way of the wireless connection to the network.

The use of such a specific small data indicator advantageously overcomes limitation experienced in the current art and such as those noted above.

In particular, the small-data indicator can be provided in a connection request signal and can include a connection-establishment cause within the connection request signal.

As a further feature to enhance the adaptability of the invention, the establishment cause can relate to the priority of the small amount of data to be transmitted.

Optionally, the small-data indicator can be provided as part of an Information Element and, if so, the Information Element can include one of an extended connection establishment cause Information Element, or an additional-information Information Element.

Yet further, the small-data indicator can be provided within a connection setup complete message to be sent from the wireless terminal.

In this manner, the small-data indicator can be provided as part of a small-data indication Information Element, and the wireless connection establishment signalling can include a connection request signal having a connection establishment cause of one of delay-tolerant-access or mo-signalling.

The invention can also provide for a wireless communication system including a wireless communications terminal as defined above and a network device arranged for receiving the wireless-connection establishment signalling.

Further, the invention can provide for a method of operating a wireless communications terminal arranged to wirelessly communicate with a network, including the steps of transmitting, as part of the wireless connection establishment procedure for forming a wireless connection between the terminal and the network, wireless-connection establishment signalling, including a small-data indicator to indicate to the network that transmission of an amount of data below a threshold value is required from the terminal by way of the wireless connection to the network.

It will be appreciated that such method can be adapted to provide for the further function features of the terminal as discussed above.

The invention can likewise provide for a method of small-data wireless communications between a wireless communications terminal and a network device in a communications network, and including the steps of transmitting from the wireless communications terminal, as part of a wireless connection establishment procedure for forming a wireless connection between the terminal and the network, wireless-connection establishment signalling, including a small-data indicator to indicate to the network that transmission of an amount of data below a threshold value is required from the terminal by way of the wireless connection to the network.

Advantageous Effects of Invention

According to the present invention, it is possible to at least provide for wireless communications methods, systems and terminal devices for small data transmission and having advantages over known such methods, systems and devices.

BRIEF DESCRIPTION OF DRAWINGS

The invention is described further hereinafter, by way of example only, with reference to the accompanying drawings in which:

FIG. 2 is a table including a list of possible RRC Establishment Causes;

FIG. 3 is a table showing, in simplified form, a relationship between the RRC cause and the (Network Access Stratum) NAS procedure as specified in TS24.301, Annex D.1;

FIG. 4 is a table illustrating the deployment of a small data cause of an embodiment of the invention;

FIG. 6 is a table illustrating the deployment of mixed priority causes according to an embodiment of the invention;

FIG. 8 is a table illustrating the schematic structure of an information element (IE) bearing a small data cause according to an embodiment of the invention;

DESCRIPTION OF EMBODIMENTS

Turning first to FIG. 4, there is provided a table illustrating a new Small Data RRC Establishment Cause according to an embodiment of the invention. The new RRC Establishment Cause for Small Data transmission is referred to herein by the simple identifier 'Small Data', as indicated by bold text in the table shown in FIG. 4. However, it will of course be appreciated that any appropriate label for indicating a small amount of data can be employed and the invention is in no way restricted to any particular label or name for this new cause.

Figure 1:
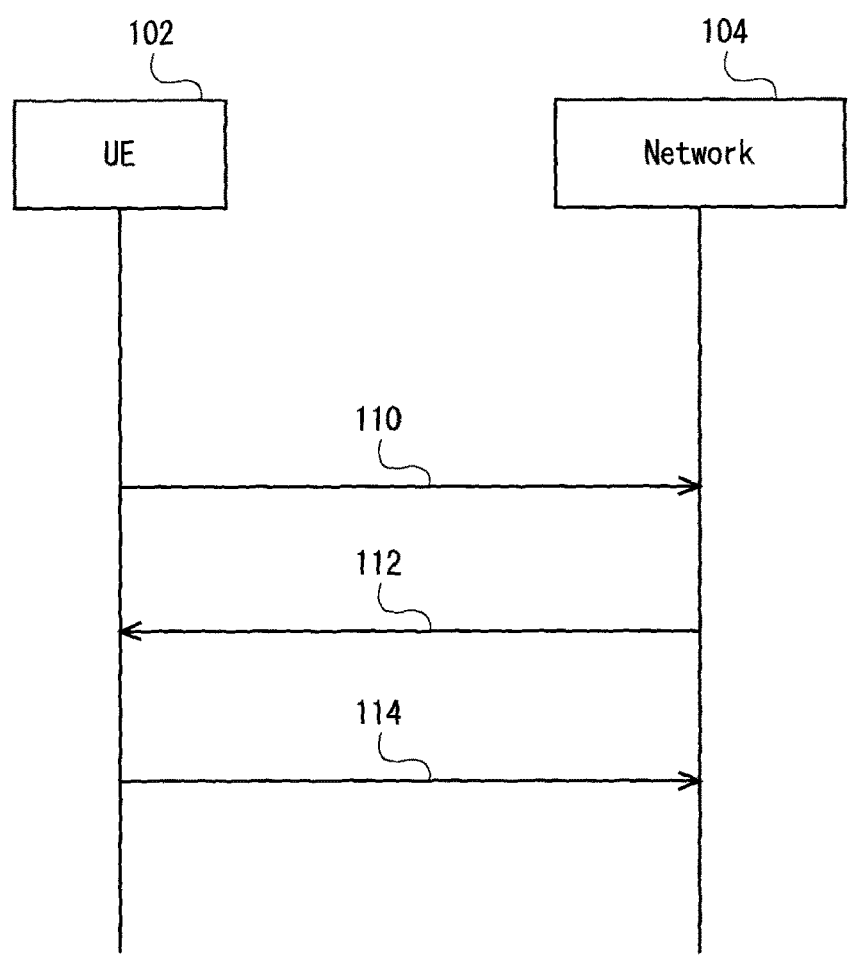
FIG. 1 is a signalling flow diagram illustrating the signalling steps of the RRC connection establishment procedure specified in the aforesaid 3GPP specification TS36.331, s.5.3.3.
Figure 5:
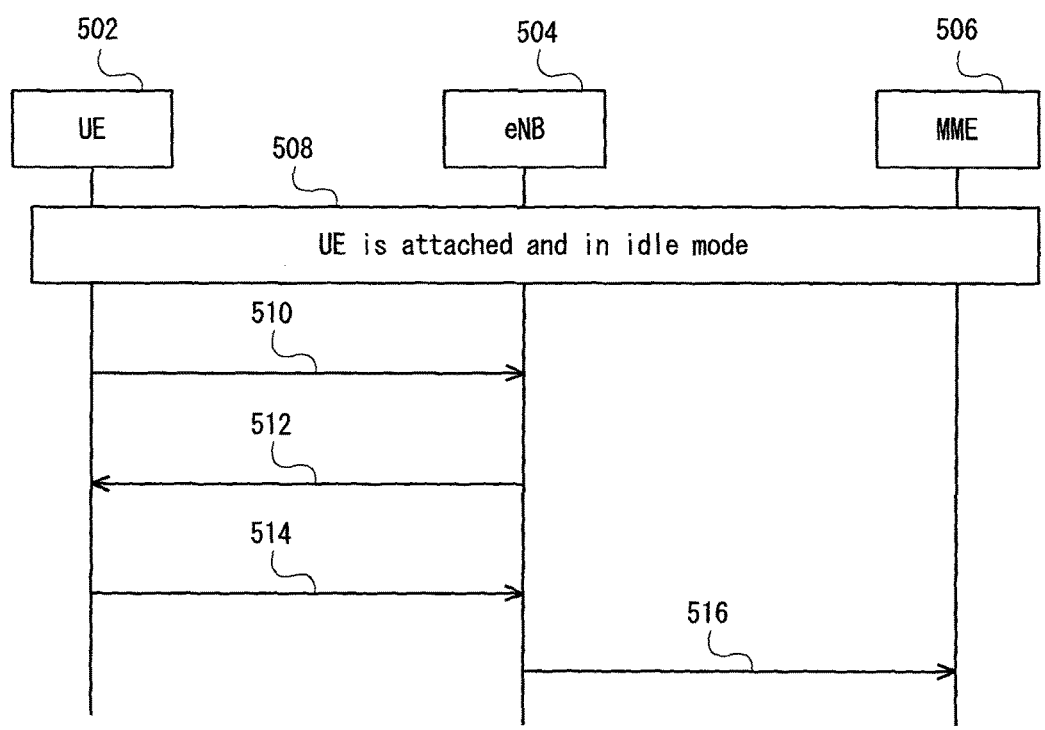
FIG. 5 is a signalling diagram within a wireless network and according to an embodiment of the invention.

FIG. 5 is a signalling flow diagram illustrating the signalling steps of a new RRC connection establishment procedure according to a first embodiment. A wireless terminal (UE) 502 and a base station (eNB) 504 of a network are represented as source and destination entities 502, 504 between which signals can be transmitted, the source and destination of each signal being indicated by respective vertical lines attached to, and associated with, the respective wireless terminal (UE) 502 and base station 504 entities. Signals, shown as horizontal arrows 510, 512, 514, are transmitted between the wireless terminal 502 and the base station 504. Initially, according to a preamble for Small Data transmission, the wireless terminal 502 is attached to the network via the base station 504 and in idle mode 508. Before Small Data transmission it is expected that the UE has already attached to the network. The UE and the MME has already exchanged their support/capability for Small Data transmission and NAS security/encryption information.

In a first step, the wireless terminal (UE) 502 transmits a RRC Connection Request message 510 intended for the network 504.

By means of the message 510, the UE's application for Small Data transmission asks the non-access stratum (NAS) to request the UE's access stratum (AS) to establish an RRC connection for Small Data. This could be a direct request from NAS to AS or within the tracking area update (TAU) message or Service Request Message or any other NAS message. Based on this request for Small Data transmission the AS of the UE triggers RRC Connection Establishment Request with a RRC Establishment Cause equal to 'Small Data'. The use of the new RRC Establishment Cause of 'Small Data' makes the base station (and hence the network) aware that the requested RRC Connection is for small data transmission.

This allows base station (eNB) to prevent measurement configuration procedures and save radio resources. It also allows the base station to treat the Small Data transmission as a low priority ('small data' could incorporate the 'low priority' meaning as well whereas that is not possible by using 'mo-signalling' in the current art). Furthermore, it allows the base station to perform any other Small Data transmission specific requirement.

In a second step, the base station 504 transmits a RRC Connection Setup message 512 intended for the wireless terminal (UE) 502. This is the usual RRC connection Setup by the eNB.

In a third step, the wireless terminal (UE) 502 transmits a RRC Connection Setup Complete message 514 intended for the base station 504 of the network. The UE includes the Small Data information as a NAS protocol data unit (PDU) IE in the RRC Connection Setup Complete message 514. The NAS PDU includes the Small Data and the Evolved Packet System (EPS) bearer ID which are encrypted. The Key Set Identifier (KSI) is also included, in unencrypted form as the MME uses it to decrypt the Small Data and the EPS bearer ID.

The base station 504 forwards an encrypted Small Data to the MME in the S1 Application Protocol (S1AP) Initial UE message 516. This message 516 is initiated by the eNB 504 and is the first message received by the MME 506 and originating from the UE 502 after the RRC connection is established. The message 516 includes both the KSI and "EPS Bearer ID" parameters from the message 514. The MME decrypts the Internet protocol (IP) packet/small data, and EPS Bearer ID. Using the EPS Bearer ID, the MME retrieves the IP address and Tunnel Endpoint Identifier (TEID) of that bearer, forms a GPRS Tunneling Protocol for User Plane (GTP-U) packet and sends the GTP-U packet to the serving gateway (S-GW). The S-GW sends the GTP-U packet to the Packet Data Network (PDN) Gateway (P-GW) and the P-GW forwards the GTP-U IP packet on to the SGi interface.

The new RRC establishment cause value 'Small Data' provides for a clear and unambiguous indication to the base station (eNB) that the RRC connection is needed for Small Data transmission. This allows for the eNodeB (eNB) to deploy all the right (common or specific, existing or future) functionality for this type of communication;

This new cause value also allows Small Data transmission to be treated as low priority data (delay tolerant access) which is not possible if the 'mo-signalling' RRC cause is used. This is significant because 3GPP usually classifies MTC communication as low priority communication. This principle would probably apply for most of the 'keep-alive' data from the smart phones, since such 'keep-alive' data is typically sent in small quantities.

The new RRC establishment cause value 'Small Data' prevents measurement configuration procedures and save radio resources. It allows for future flexibility including easy small data transmission-related upgrades to base stations such as the eNodeB.

The above-described new principle of Small Data transmission, including the new RRC establishment cause value 'Small Data', could also be used with other NAS procedures like TAU and Service Request.

FIG. 6 is a table illustrating a new High/low priority Small data RRC Establishment Cause for small data transmission in LTE, according to another, second embodiment. The new RRC Establishment Cause for Small Data transmission is called either 'High Priority Small Data' or 'Low Priority Small Data', as indicated by bold text in the table shown in FIG. 6, according to whether the small data is allocated a high priority or a low priority, respectively, the priority value (high or low) here being allocated for example by the wireless terminal. However it should be noted that this priority could be allocated by the application that is to transmit the small data, such that the high/low priority configuration could be on a per application basis.

Figure 7:
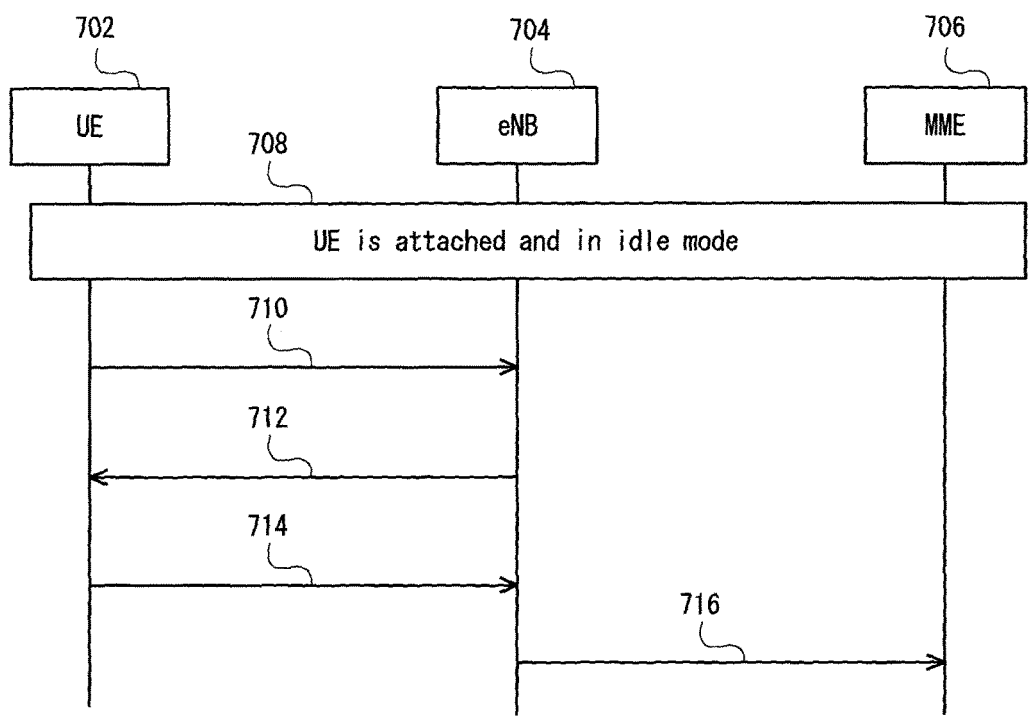
FIG. 7 is a signalling diagram within a wireless network and according to the embodiment of FIG. 6.

FIG. 7 is a signalling flow diagram illustrating the signalling steps of a new RRC connection establishment procedure according to the second embodiment described immediately above in relation to FIG. 6. The sequence of events is similar to that illustrated in FIG. 5 in that, within a network environment including a UE 702, eNB 704 and MME 706, and with the UE 702 attached 708 in idle mode, RRC connection request 710, RRC connection setup 712 and RRC connection setup complete 714 signals are exchanged as shown between the UE 702 and the eNB 704. The base station 704 transmits S1AP Initial UE message 716 intended for the MME 706. A difference however is that, for Small Data that is a low priority (MTC and some 'keep-alive' messages from smart phone applications), the RRC connection is established with the 'Low Priority Small Data' RRC Establishment Cause by including such cause within the RRC connection request 710. On the other hand, for Small Data that is not a low priority (this would be some 'keep-alive' messages from smart phone applications and any other type of Small Data transmission that is not a low priority), the RRC connection is established with the 'High Priority Small Data' RRC Establishment Cause by including such cause within the RRC connection request 710.

According to this embodiment, it is possible to further distinguish between low priority small data transmission (coming mostly from MTC applications) and higher-than-low-priority (i.e. high or normal priority) 'Small Data' transmission (including for example some keep-alive messages from smart phones and potentially some MTC applications).

The wireless terminal 702 could be configured as NAS signalling low priority (see TS 24.368 s.5.3), in which case the small data would be only of low priority. However, the wireless terminal 702 (UE) could also be configured to override NAS signalling priority and some applications in the UE may need to send high priority small data, in which case the High Priority Small Data RRC connection establishment cause would be needed for the base station (eNB) 704 to understand that the data is both high priority and small data.

It is also noted that the above-described principle of using 'Small Data' could be extended to functionalities and applications other than MTC, and the generic approach described in relation to the embodiments described herein would allow this extension.

The new RRC establishment cause values 'High Priority Small Data' and 'Low Priority Small Data' has the same benefits as the embodiment described in relation to FIGS. 4 and 5 ('Small Data' cause) and additionally has the benefit that it is clear whether the Small Data is a high priority Small Data (like some 'keep-alive' messages from smart phones and any other type of small data that is considered a high priority) or low priority Small Data (like from MTC).

FIG. 8 is a table illustrating a new Small Data RRC Establishment Cause for Small Data transmission, according to a further, third, embodiment.

According to this embodiment, a new 'Extended RRC Establishment Cause' IE or new 'Additional Information' IE with currently only one value 'Small Data' is provided as part of a new RRC connection establishment procedure, as shown in bold in the table of FIG. 8.

Figure 9:
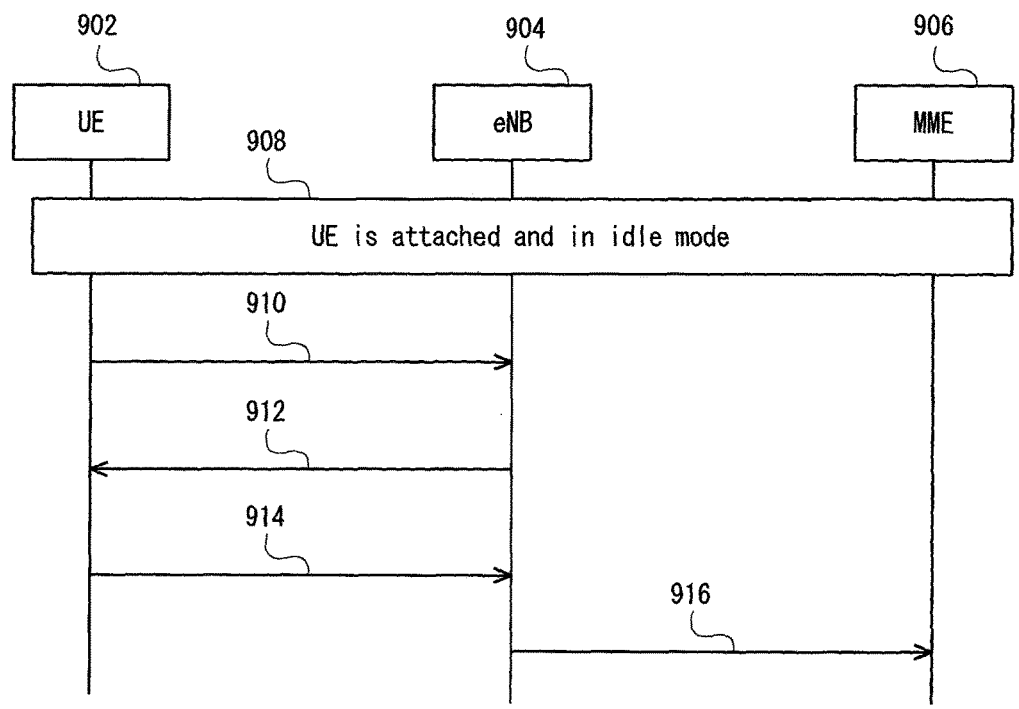
FIG. 9 is a signalling diagram within a wireless network and according to the embodiment of FIG. 8.

FIG. 9 is a signalling flow diagram illustrating the signalling steps of this new RRC connection establishment procedure according to this third embodiment.

As seen from FIG. 9, the sequence of signalling events is similar to that illustrated previously in that, within a network environment including a UE 902, eNB 904 and MME 906, and with the UE 902 attached 908 in idle mode, RRC connection request 910, RRC connection setup 912 and RRC connection setup complete 914 signals are exchanged as shown between the UE 902 and the eNB 904. The base station 904 transmits S1AP Initial UE message 916 intended for the MME 906. However, in this particular embodiment, an Extended RRC Establishment Cause within the RRC connection request 910 is a new IE that can be used by RRC Connection Request message (and any other RRC message) to indicate a Small Data transmission. It could be used as an addition to the existing RRC Establishment Cause within the RRC Connection Establishment message, for example the RRC Establishment Cause=Mobile Originating Data or Mobile Originating Signalling and the RRC Extended Establishment Cause=Small Data, as seen in FIG. 9. This way the Small Data transmission is clearly indicated to the eNB and at the same time the new Extended RRC Establishment Cause IE is decoupled from the NAS or RRC connection establishment procedure and it is possible to use with other procedures as well.

Figure 10:
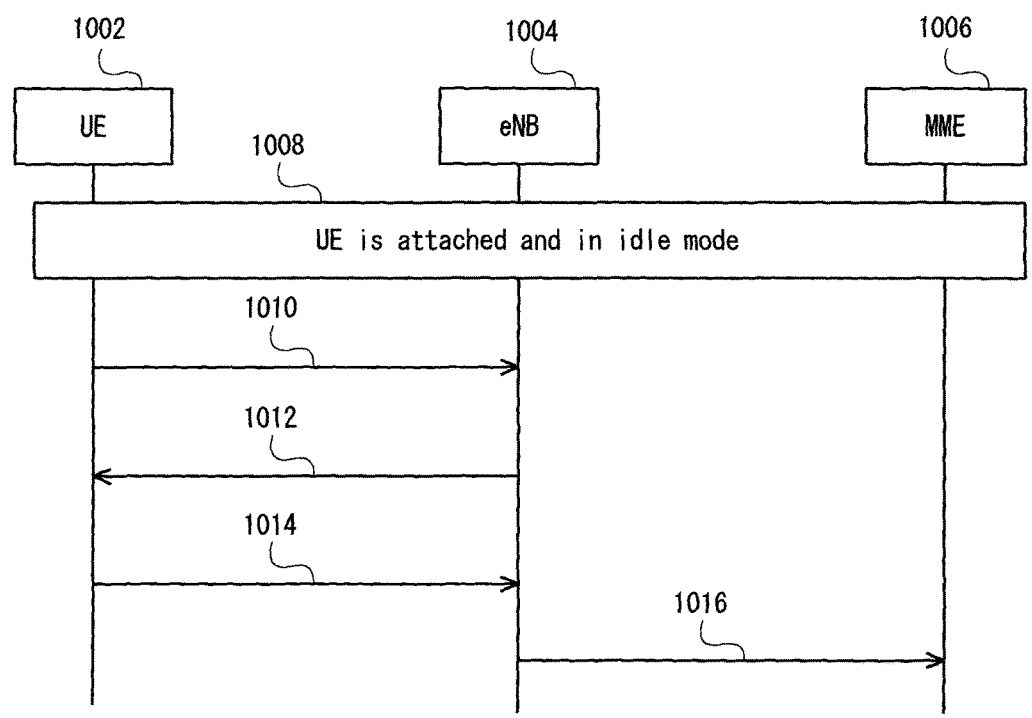
FIG. 10 is a signalling diagram within a wireless network and according to yet a further embodiment of the invention.

FIG. 10 is a signalling flow diagram illustrating the signalling steps of a further new RRC connection establishment procedure according to a further, fourth, embodiment.

According to the fourth embodiment illustrated in FIG. 10, the sequence is that, within a network environment including a UE 1002, eNB 1004 and MME 1006, and with the UE 1002 attached in idle mode 1008, RRC connection request 1010, RRC connection setup 1012 and RRC connection setup complete 1014 signals are exchanged as shown between the UE 1002 and the eNB 1004. The base station 1004 transmits S1AP Initial UE message 1016 intended for the MME 1006. In this embodiment however, the UE 1002 transits a message 1010 asking for a RRC Connection Request using a RRC Establishment cause equal to 'Delay Tolerant Access' or equal to 'mo-signaling'.

In the RRC Connection Setup Complete message 1014, the UE encloses the small data in a NAS container. The UE also includes a new 'small data indication' IE in the RRC Connection Setup Complete message 1014.

The above description of embodiments includes descriptions of new RRC Establishment Cause values: a new 'Small Data' RRC Establishment Cause according to a first embodiment; and two new 'High Priority Small Data' and 'Low Priority Small Data' RRC Establishment Cause values according to a second embodiment. The proposed new RRC Establishment Cause values allow for a base station to distinguish Small Data transmission and to distinguish between High and Low Priority Small Data, so that the base station and other nodes of the network (e.g. MME and S-GW) treat Small Data transmission appropriately.

Additionally, according to a third embodiment described above, a new Extended 'RRC Establishment Cause' IE or 'Additional Information' IE is defined. The Extended RRC Establishment Cause IE has 'Small Data' cause value to be used for Small Data transfer. It has eight more available cause values for future use.

Additionally, according to the fourth embodiment described above, a new small data indication in the RRC Connection Setup Complete message is defined. This new 'small data indication' is introduced to allow the base station to be aware that the procedure is for small data, so that the base station can perform adequate small data-related procedures (e.g. eNB does not trigger UE measurements).

All the above embodiments are applicable to GSM/EDGE Radio Access Network (GERAN) and UTRAN wireless access technologies. The only differences to the above described solutions for LTE are the following:
(a) The eNB node in LTE is equivalent to Base Station in GERAN and to Radio Network Controller (RNC) in UTRAN;
(b) The MME node in LTE is the equivalent to Serving GPRS Support Node (SGSN) in GERAN and UTRAN;
(c) Whereas in LTE the Small Data is transferred from the UE to eNB within the RRC Connection Establishment procedure (in RRC Connection Setup Complete message), in GERAN and UTRAN the Small Data is transferred from UE to Base Station in GERAN or to RNC in UTRAN immediately after the end of the RRC connection Establishment procedure.
(d) The RRC Establishment Cause in GERAN is known as RR Establishment Cause and has a different format and set of cause values. However the proposed new 'Small Data' cause value is equally applicable for RR Establishment Cause in GERAN as well.

This application is based upon and claims the benefit of priority from United Kingdom Patent Application No. 1305796.3, filed on Mar. 28, 2013, the disclosure of which is incorporated herein in its entirety by reference.

INDUSTRIAL APPLICABILITY

The present invention can be applied to small data transmission within a wireless network environment.

REFERENCE SIGNS LIST 102, 502, 702, 902, 1002 UE
104 NETWORK
110, 510 RRC CONNECTION REQUEST MESSAGE
112, 512 RRC CONNECTION SETUP MESSAGE
114, 514 RRC CONNECTION SETUP COMPLETE MESSAGE
504, 704, 904, 1004 eNB
506, 706, 906, 1006 MME
516, 716, 916, 1016 S1AP INITIAL UE MESSAGE
710, 910, 1010 RRC CONNECTION REQUEST SIGNAL
712, 912, 1012 RRC CONNECTION SETUP SIGNAL
714, 914, 1014 RRC CONNECTION SETUP COMPLETE SIGNAL

The invention claimed is:

1. A user equipment (UE) arranged to wirelessly communicate with a network, the UE being arranged to transmit a Radio Resource Control (RRC) Connection Request message as part of a wireless connection establishment procedure for forming a wireless connection between the UE and the network,
the RRC Connection Request message including an RRC establishment cause, wherein the RRC establishment cause is configurable to include any of a plurality of different cause indicators including: a mobile originating signalling (mo-signalling) indicator; a mobile terminating access (mt-Access) indicator; a mobile originating data (mo-data) indicator; and a delay tolerant access indicator; and at least one further indicator of mobile originating data associated with the UE when operating in machine type communication mode.

2. A method of operating a user equipment (UE) arranged to wirelessly communicate with a network, including the steps of:
transmitting a Radio Resource Control (RRC) Connection Request message as part of a wireless connection establishment procedure for forming a wireless connection between the UE and the network,
the RRC Connection Request message including an RRC establishment cause, wherein the RRC establishment cause is configurable to include any of a plurality of different cause indicators including: a mobile originating signalling (mo-signalling) indicator; a mobile terminating access (mt-Access) indicator; a mobile originating data (mo-data) indicator; and a delay tolerant access indicator; and at least one further indicator of mobile originating data associated with the UE when operating in machine type communication mode.

3. A method of small-data wireless communications between a user equipment (UE) and a network device in a communications network, and including the steps of transmitting from the UE, a Radio Resource Control (RRC) Connection Request message as part of a wireless connection establishment procedure for forming a wireless connection between the UE and the network, the RRC Connection Request message including an RRC establishment cause, wherein the RRC establishment cause is configurable to include any of a plurality of different cause indicators including: a mobile originating signalling (mo-signalling) indicator; a mobile terminating access (mt-Access) indicator; a mobile originating data (mo-data) indicator; and a delay tolerant access indicator; and at least one further indicator of mobile originating data associated with the UE when operating in machine type communication mode, and including operating the UE according to the method of claim 2.

4. A method of small-data wireless communications between a user equipment (UE) and a network device in a communications network, and including the steps of:
transmitting from the UE, a Radio Resource Control (RRC) Connection Request message as part of a wireless connection establishment procedure for forming a wireless connection between the UE and the network, the RRC Connection Request message including an RRC establishment cause, wherein the RRC establishment cause is configurable to include any of a plurality of different cause indicators including: a mobile originating signalling (mo-signalling) indicator; a mobile terminating access (mt-Access) indicator; a mobile originating data (mo-data) indicator; and a delay tolerant access indicator; and at least one further indicator of mobile originating data associated with the UE when operating in machine type communication mode.

* * * * *